United States Patent [19]

Kirschbaum et al.

[11] 4,408,736
[45] Oct. 11, 1983

[54] LANDING GEAR DOOR MUD GUARD

[75] Inventors: Nathan Kirschbaum, Huntington; Augustus Sclafani, East Northport, both of N.Y.

[73] Assignee: Grumman Aerospace Corporation, Bethpage, N.Y.

[21] Appl. No.: 246,732

[22] Filed: Mar. 23, 1981

[51] Int. Cl.³ ..................... B64C 25/10; B64C 25/16
[52] U.S. Cl. ............................ 244/100 R; 244/102 A
[58] Field of Search .......... 244/100 R, 102 R, 102 A, 244/103 R, 104 R, 104 FP, 130, 202; 280/156

[56] References Cited

U.S. PATENT DOCUMENTS

| | | | |
|---|---|---|---|
| 1,890,902 | 12/1932 | Douglas | 244/102 R |
| 1,894,582 | 1/1933 | DeBell | 244/102 R |
| 2,548,832 | 4/1951 | Tydon | 244/101 |
| 2,814,454 | 11/1957 | Atkins et al. | 244/53 B |
| 3,670,996 | 6/1972 | Jenny | 244/103 R |

Primary Examiner—Trygve M. Blix
Assistant Examiner—Rodney A. Corl
Attorney, Agent, or Firm—John P. Kozma; Richard G. Geib; Daniel J. Tick

[57] ABSTRACT

A combination landing gear door and splash guard for an aircraft landing gear which includes a linkage to control the clearance between the door/splash guard and a runway surface with respect to the extension of a shock absorbing strut of the landing gear.

10 Claims, 7 Drawing Figures

LANDING GEAR DOOR MUD GUARD

BACKGROUND OF THE INVENTION

The present invention relates in general to fairings or doors for aircraft landing gear, and in particular to a landing gear door which dually serves as a fairing and a splash guard against debris thrown up from the wheels.

A persistent problem with deploying aircraft from wet or muddy runways or unpaved surfaces of dirt, grass or gravel is the tendency of the wheels to throw up mud, rocks and other debris which can cause damage to engine inlets, radomes, flaps and fuselage skinning. Various prior art constructions have been designed in an attempt to alleviate this problem.

One such design is found in U.S. Pat. No. 3,670,996, issued to Jenny. The Jenny deflector consists essentially of a plate which remains in a horizontal position both when the landing gear is extended and retracted. A disadvantage of the Jenny design is that the deflector plate is completely separate from the fuselage, and must be precisely positioned over the wheel well to function efficiently as a fairing. Furthermore, complex linkages are required to position the plate around the extended landing gear, and the area of the plate must be rather large in comparison with the wheel.

By pivotally connecting the wheel well door to the airframe, an efficient fairing, i.e., one that presents a minimum of air resistance due to discontinuity between the fuselage and door surfaces, may be constructed. Examples in the prior art are U.S. Pat. Nos. 1,890,902; 1,894,582; 1,956,313; and 2,129,824 issued to Douglas; DeBell, Capelis; and de Seversky respectively. The Douglas and Capelis fairings, which both include sections positioned behind the wheel, offer the potential of serving as splash guards. However, neither these nor any other prior art references suggest means by which the clearance between the door and the ground or runway surface may be controlled.

Control of the ground clearance is necessary because landing gear shock struts allow considerable movement of the wheels with respect to the airframe. Thus, a door positioned behind the wheels and spaced sufficiently close to the ground to deflect mud, stones, etc. from the wheels when the shock strut is fully compressed will be too far from the ground to intercept debris when the shock strut is extended. Conversely, of course, if the clearance is correctly set for an extended strut, compression of the shock strut would result in the door dragging on the ground.

SUMMARY OF THE INVENTION

It is therefore a principal object of the present invention to provide a landing gear fairing capable of deflecting mud, slush and stones thrown toward engine inlets, flaps, radomes and fuselage skinning by the rotational motion of the wheels to prevent damage caused thereby.

It is a further object of this invention to provide a combination landing gear fairing/slush guard which is both functionally efficient and of simple design.

Yet another object of the present invention is to provide a means for controlling the clearance between the lower edge of a landing gear slush deflector and the ground with respect to the state of compression of a landing gear shock strut.

These and other objects and advantages are realized, in brief, by providing a landing gear door or fairing with a pivotal mount to the airframe near the aft portion of the wheel well. A linkage means, described in detail later in this specification, connects the door with a moveable shock strut cylinder of the landing gear and controls the clearance between the lower edge of the door and the ground by adjusting the angle of the door with respect to the aircraft fuselage.

Another object of this invention is to provide a combination landing gear fairing/splash guard which may be adapted for use with either a steerable or non-steerable landing gear.

BRIEF DESCRIPTION OF THE DRAWINGS

These and other objects and features of the present invention are set out in detail in the following description of several preferred embodiments, a better understanding of which may be gained by reference to the drawings forming a part of this specification, in which.

DETAILED DESCRIPTION OF PREFERRED EMBODIMENTS

Figure 1:
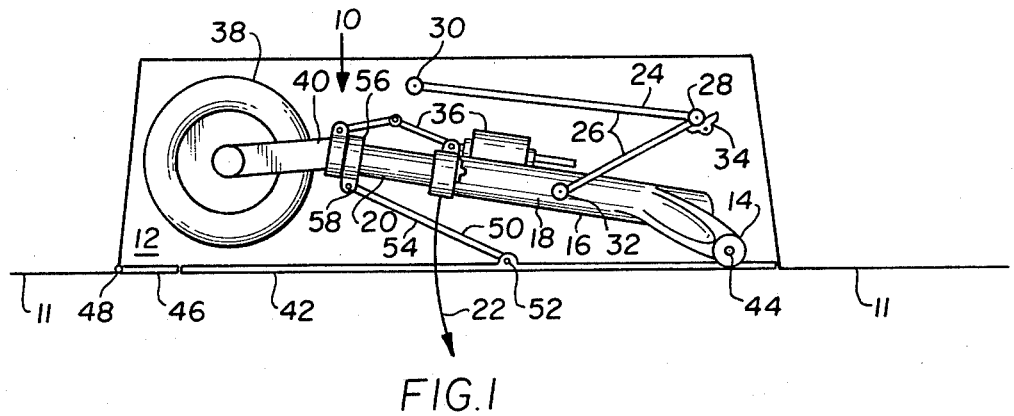
FIG. 1 is a side elevation or the invention with an associated landing gear in its retracted position.

Referring to FIG. 1, a landing gear assembly 10 of an aircraft 11 is shown in its retracted, in-flight position reposed within a compartment or wheel well 12. Compartment 12 may be within the forward section of an aircraft fuselage or in a wing mounted nacelle. In order to briefly explain the concept of the present invention only a nose landing gear associated with the fuselage 11 is shown. It will be readily appreciated by one skilled in the art that debris thrown up by the nose wheels presents the greatest potential for damage to engine intakes, etc. This is not to say the invention will not also find utility with the main landing gear.

While landing gear assembly 10 is conventional certain details of a landing gear assembly to which are adapted several preferred embodiments of the invention will be described herein. These details are presented as an example to aid those skilled in the art in understanding the interconnections between a landing gear and the fairing/slush guard of the present invention, and should not be considered as limiting with respect to the various configurations of landing gear to which the invention may be adapted. Other landing gear retraction geometries, for example, may be employed without departing from the scope of the present invention.

As seen in FIGS. 1, 2, 3, 5 and 6, an airframe mounted pivot 14 near the aft portion of wheel well 12 supports a main strut assembly 16 of landing gear 10. The upper portion of main strut 16 includes an outer or stationary shock strut cylinder 18 which is pivotally attached to the aircraft at 14 and an inner, moveable shock strut cylinder 20 slidably disposed within cylinder 18.

Figure 2:
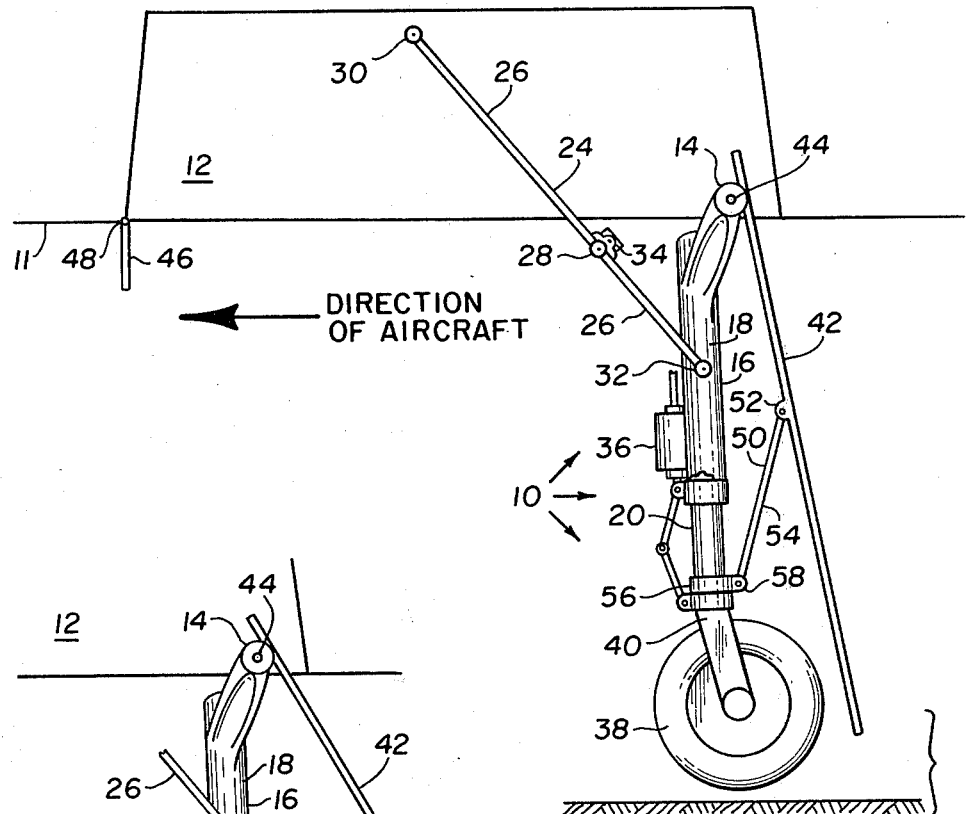
FIG. 2 is a view similar to FIG. 1, but with the landing gear extended just prior to touch down.

The terms "upper," "stationary," and "moveable" as used above presume that the landing gear is in its nonretracted (deployed) position as in FIG. 2. Thus, cylinder 18 is stationary and cylinder 20 is moveable in a vertical direction with respect to the aircraft 11 when the landing gear 10 is deployed. Also it should be obvious that an inner cylinder could be used as the stationary member with a moveable outer cylinder, as contrasted with the configuration described above.

Landing gear 10 is deployed by pivoting strut assembly 16 in the direction of arrow 22 (FIG. 1) and may be accomplished, for example, by means of a retraction linkage mechanism 24. The retraction linkage 24 may consist of a pair of folding arms 26 pivotally joined, as at 28, to each other, to the aircraft 11 by pivot 30 mounted intermediately in compartment 12, and to pivot 32 mounted on stationary shock strut cylinder 18. Retraction linkage 24 further includes motor means (not shown) to actuate the folding and unfolding of arms 26 and locking means 34 to hold the landing gear 10 in its deployed position.

Further included in landing gear 10 is a fluid shock absorber means 36 mounted on main strut 16 and a wheel 38 pivotally mounted within a yoke 40 which is attached to the lower end of moveable shock strut cylinder 20.

A landing gear door 42 serves as a fairing, covering compartment 12 when the landing gear is in its retracted, in-flight position (FIG. 1). Door 42 is hinged at the aft of compartment 12 to the aircraft by a pivot 44, which may have a pivotal axis coincidental with pivot 14.

An auxiliary door 46 covers the forward portion of compartment 12, and in the embodiment shown in FIG. 2, door 46 is hinged to the aircraft at 48. Door 46 is opened and closed by means of conventional linkage (not shown) coupled to retraction linkage 24.

In addition to covering the opening to compartment 12, door 42 may be extended on either side to conform to aircraft 11 on either side of the wheel well when the landing gear 10 is retracted, to provide added protection from mud and slush when used as a slush guard with the landing gear deployed.

Figure 4:
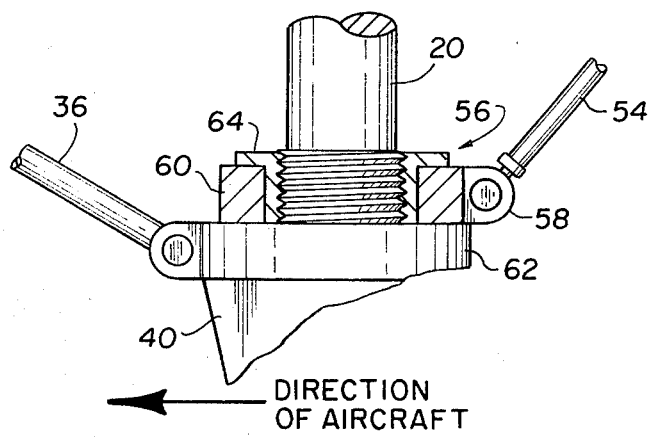
FIG. 4 is a detailed side elevation of a portion of FIG. 2.

A door drive linkage 50 flexibly connects the door 42 with the main strut assembly 16. Linkage 50 includes a pivotal connection 52 mounted intermediately on door 42, a rod or door drive link 54 connected to pivot 52, and a pivot assembly 56 connecting rod 54 to moveable shock strut cylinder 20. Referring to FIG. 4, pivot assembly 56 consists of a pivot 58 mounted on a collar 60 which is rotatable about cylinder 20. Collar 60 is prevented from moving axially along cylinder 20 by abutting upper section 62 of yoke 60 and gland nut 64 which is threadedly connected to cylinder 20.

Figure 5:
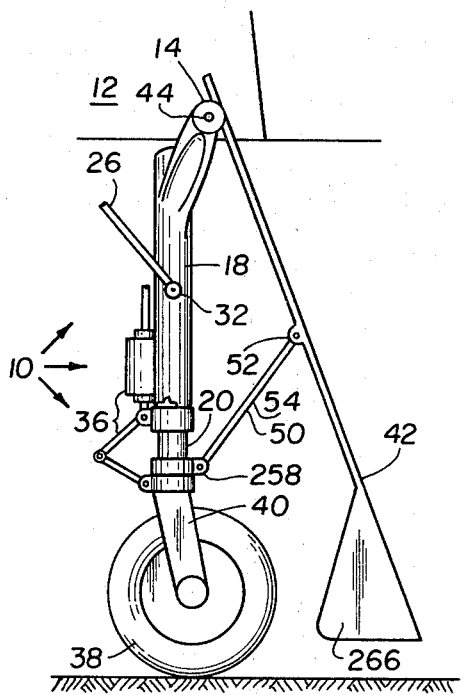
FIG. 5 is a side elevation of a second embodiment of the invention.

A second embodiment of the invention, adapted for use with a non-steerable landing gear, is depicted in FIG. 5. Identical components in FIG. 5 are referenced by identical numbers, while elements not corresponding exactly with the first embodiment bear reference numbers prefixed by a "2".

Referring to FIG. 5, rod 54 is connected to main strut 16 by means of a pivot 258 mounted on the upper section 62 of yoke 40. Side skirts 266 conforming to the inner wheel well contours are attached to the lower portion of door 42, and extend forward on either side of wheel 38 when landing gear 10 is deployed but shock strut 16 is uncompressed. Side skirts 266 in the non-steerable wheel embodiment replace extensions on either side of door 42 in the steerable wheel embodiment which conform to the external aircraft contour.

Figure 3:
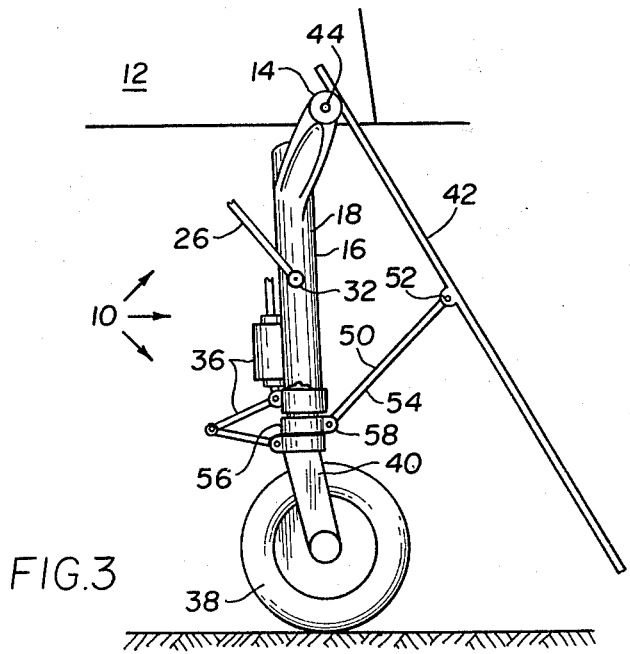
FIG. 3 is a view similar to FIG. 2, but with the landing gear shock strut in a compressed state.

Other elements of the embodiment depicted in FIG. 5 are identical to the embodiment of FIGS. 1-3, therefore their description will not be repeated.

Figure 6:
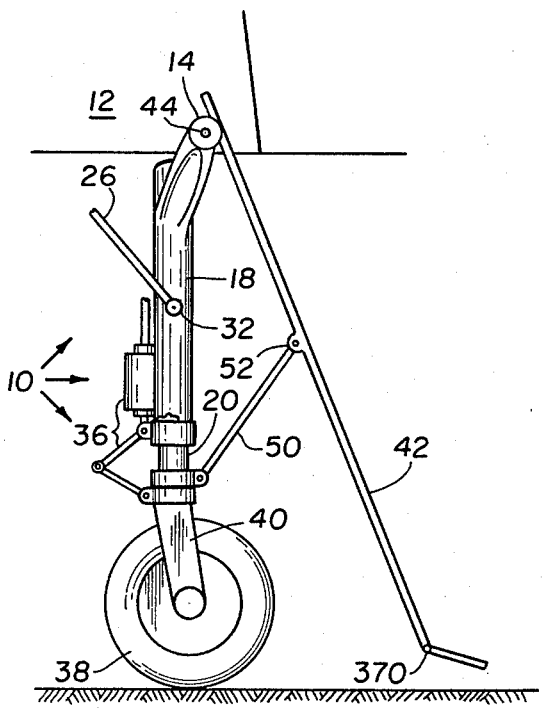
FIG. 6 is a side elevation of a third embodiment of the invention.
Figure 7:
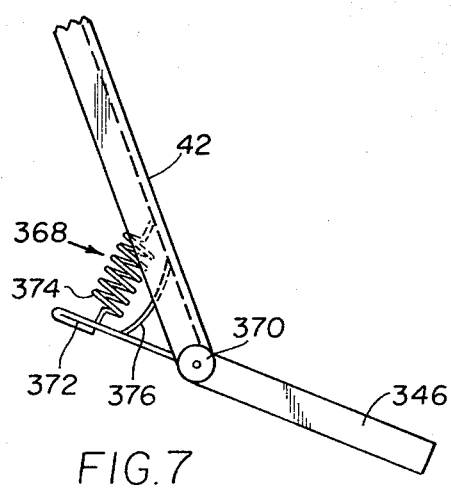
FIG. 7 is a detailed view of a portion of FIG. 6.

A still further embodiment of the present invention is shown in FIGS. 6 and 7. Again, elements in FIGS. 6 and 7 identical to those in FIGS. 1-3 retain the identical reference numbers, while changed or added elements are prefixed by a "3".

Referring to FIG. 6, an embodiment of the invention is shown in which the auxiliary door 46 is replaced by a flap 346 hinged to the lower edge of door 42 and serving as an extended slush guard.

An auxiliary linkage 368 connects flap 346 to door drive linkage 50. As seen in FIG. 7, flap 346 is hinged, as at 370, to door 42, and a tab 372 extends from flap 346 opposite hinge 370. Tab 372 is connected to door 42 by biasing means, such as spring 374, and limiting means, such as cable 376.

OPERATION OF THE INVENTION

In operation, door 42 serves as a fairing with the landing gear 10 in retracted position of FIG. 1, reducing the drag of the landing gear while aircraft 11 is in flight. With landing gear 10 in its deployed position, FIG. 2, door 42 functions as a slush guard, deflecting mud, slush and stones thrown up by the rotation of wheel 38 during take-off and landing, and preventing damage which such debris may cause to engine intakes, fuselage skinning, flaps, etc.

Linkage 50 maintains door 42 at a sufficient height to clear a runway surface in the event of a flat tire, yet sufficiently close to the surface to deflect harmful debris. Thus, as main strut 16 becomes compressed, moveable shock strut cylinder 20 moves up with respect to the aircraft, bringing pivots 44 and 58 (or 258) closer together. As seen in the Figures, pivots 44 and 58 (or 258) form a triangle with pivot 52, and as pivots 44 and 58 move closer together, and the angle between door 42 and strut 16 is increased, raising the lower edge of door 42.

In the embodiment depicted in FIGS. 1-4, wheel 38 is steerable by rotating moveable shock strut cylinder 20 with respect to stationary shock strut 18, collar 60 and door drive linkage 50. In the non-steerable wheel embodiment of FIG. 5, side skirts 266 provide added protection against debris thrown to either side by wheel 38.

In the embodiment depicted in FIGS. 6 and 7, flap 346 provides reduced distance between door 42 and the runway surface in the extended position (FIG. 2) over that distance that would have to be provided with the shock strut fully compressed (FIG. 3). The angular relationship of flap 346 with respect to door 42 is maintained by biasing means 374 and limiting means 376. Upon retraction of landing gear 10, flap 346 is caused to lie flat to the local aircraft external contour by the camming of tab 372 against the side edges of wheel well 12.

While several embodiments of the present invention have been detailed in the foregoing description, these particulars should not be considered as limiting the scope of the invention, as various modifications may be made by those skilled in the art without departing from the scope set forth in the following claims.

What is claimed is:

1. A combination fairing and splash guard for an aircraft landing gear comprising:
   a door;
   means for pivotally attaching the door to the aircraft;
   a collar;

a means for rotatably attaching the collar to a moveable shock strut cylinder slidably disposed within a stationary shock strut cylinder of the landing gear;

a first pivot mounted on the collar;

a second pivot mounted intermediately on the door, said first and second pivots being parallel to a pivotal axis of the door; and a rod attached at one end to the first pivot and at another end to the second pivot.

2. The device of claim 1 in which the landing gear is steerable by rotating the moveable shock strut cylinder with respect to the stationary shock strut cylinder.

3. The device of claim 1 which further comprises a pair of side skirts attached to the lower portion of the door.

4. The device of claim 1 which further comprises:

a flap;

a hinge connecting said flap to the door opposite the pivotal attaching means; and a means for maintaining the angular relationship of the flap with respect to the door.

5. The device of claim 4 in which the maintaining means comprises:

a tab extending from the flap opposite the hinge;

a spring having one end connected to the tab and another end connected to the door; and a limiting cable having one end connected to the tab and another end connected to the door.

6. A combination fairing and splash guard for an aircraft landing gear, said landing gear having a main strut with a stationary shock strut cylinder, a moveable shock strut cylinder slidably disposed within the stationary shock strut cylinder, and a wheel mounted on the moveable shock strut cylinder, said fairing and splash guard comprising:

a door pivotally attached directly to the aircraft aft of the landing gear;

a first pivot mounted in a fixed axial position on the moveable shock strut cylinder;

a second pivot mounted intermediately on the door, said first and second pivots being parallel to a pivotal axis of the door; and a rod attached at one end to the first pivot and at another end to the second pivot, said rod being sized and said axial position on the moveable shock strut cylinder being chosen to maintain the door at a height both sufficiently high to clear a runway surface and sufficiently close to such surface for the door to deflect harmful debris thrown up by the wheel regardless of a state of compression of the landing gear.

7. In combination with an aircraft retractable landing gear having a compressible strut and a door, said strut including a stationary and a moveable shock strut cylinder, said stationary shock strut cylinder and said door being pivotally mounted at the rear of a wheel well in which the landing gear is stored when retracted, the improvement which comprises:

a collar rotatably mounted on the moveable shock strut cylinder;

a first pivot attached to the collar;

a second pivot attached to the door intermediately along its length; and a door drive link attached to the first pivot at one end and to the second pivot at another end, said door drive link being sized to maintain the door at a height both sufficiently high to clear a runway surface and sufficiently close to such surface for the door to deflect harmful debris thrown up by the landing gear.

8. A combination fairing and splash guard for an aircraft comprising:

a landing gear having a stationary shock strut cylinder pivotally attached to the aircraft and a moveable shock strut cylinder slidably disposed within the stationary shock strut cylinder;

a compartment in which the landing gear may be reposed when the aircraft is in flight;

a door sized to cover the compartment;

a means for pivotally attaching the door to the aircraft;

a collar;

a means for rotatably attaching the collar to the moveable shock strut cylinder;

a first pivot mounted on the collar;

a second pivot mounted intermediately on the door, said first and second pivots being parallel to a pivotal axis of the door; and a rod attached at one end to the first pivot and at another end to the second pivot.

9. The device of claim 8 in which the door is extended on either side to conform to the external aircraft contour on either side of the compartment.

10. The device of claim 9 which further comprises a pair of side skirts attached to the lower portion of the door, said side skirts conforming to the inner contour of the compartment.

* * * * *